(12) United States Patent
Chen

(10) Patent No.: US 12,159,338 B1
(45) Date of Patent: Dec. 3, 2024

(54) METHOD FOR CONTROLLING AVATAR IN VIRTUAL ENVIRONMENT BY DETERMINING A DIFFERENCE IN POSES BETWEEN A TARGET OBJECT AND A REFERENCE OBJECT, HOST, AND COMPUTER READABLE STORAGE MEDIUM

(71) Applicant: HTC Corporation, Taoyuan (TW)

(72) Inventor: Yi-Chun Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/482,022

(22) Filed: Oct. 6, 2023

(51) Int. Cl.
*G06T 13/00* (2011.01)
*G06F 3/01* (2006.01)
*G06T 7/73* (2017.01)

(52) U.S. Cl.
CPC .............. *G06T 13/00* (2013.01); *G06F 3/011* (2013.01); *G06T 7/74* (2017.01); *G06T 2207/30196* (2013.01); *G06T 2207/30244* (2013.01)

(58) Field of Classification Search
None
See application file for complete search history.

(56) References Cited

U.S. PATENT DOCUMENTS

| 10,929,670 B1* | 2/2021 | Troy | G06V 20/653 |
| 2021/0382544 A1* | 12/2021 | Butcher | G06V 40/10 |
| 2022/0323862 A1* | 10/2022 | Baba | G06F 3/013 |

FOREIGN PATENT DOCUMENTS

| CN | 111771231 | | 10/2020 | |
| CN | 113384880 A | * | 9/2021 | |
| CN | 116261850 | | 6/2023 | |
| CN | 116503520 A | * | 7/2023 | A63F 13/52 |

OTHER PUBLICATIONS

"Office Action of Taiwan Counterpart Application", issued on Aug. 2, 2024, p. 1-p. 8.

* cited by examiner

*Primary Examiner* — Kirk W Hermann
(74) *Attorney, Agent, or Firm* — JCIPRNET

(57) ABSTRACT

A solution that allows the avatar corresponding to the target object tracked by the external tracking device can be properly displayed in the visual content that corresponds to the field of view of the virtual camera, even if the coordinate systems used by the host and the external tracking device are different.

14 Claims, 6 Drawing Sheets

METHOD FOR CONTROLLING AVATAR IN VIRTUAL ENVIRONMENT BY DETERMINING A DIFFERENCE IN POSES BETWEEN A TARGET OBJECT AND A REFERENCE OBJECT, HOST, AND COMPUTER READABLE STORAGE MEDIUM

BACKGROUND

1. Field of the Invention

The present disclosure generally relates to a mechanism for adjusting the visual content, in particular, to a method for controlling an avatar in a virtual environment, a host, and a computer readable storage medium.

2. Description of Related Art

In the technology of virtual reality (VR), a virtual camera plays a crucial role in VR technology by simulating the functions of real-world cameras, enabling users to observe, record, and interact within the virtual world, thereby enhancing the interactivity and realism of the VR experience.

In one possible implementation, the virtual camera can be disposed at a particular position of the VR environment, and the scene captured in the field of view of the virtual camera can be shown as the visual content (e.g., VR content) for the user to see. For example, the virtual camera may be used to capture an avatar in the VR environment, such that the user can see the avatar in the visual content.

In the VR technology, the pose of a human body can be tracked via an external tracking device, and the tracked pose of the human body can be provided to the VR host (e.g., a head-mounted display (HMD) and/or other computer devices) for adjusting the pose of the avatar corresponding to the human body.

However, since the coordinate systems used by the external tracking device and the VR host may be different, the avatar may not be correctly displayed in the field of view of the virtual camera, which may lead to a less satisfying visual quality.

See FIG. 1, which shows a schematic diagram of a tracking scenario. In FIG. 1, the external tracking device 13 may determine that the to-be-tracked human body 10 locates at a coordinate (−1, −2) of a second coordinate system (which may have the origin O2) used by the external tracking device 13, wherein this coordinate is represented by "(−1, −2) @O2" in FIG. 1. In this case, the VR host may accordingly display the avatar 12 at the coordinate (−1, −2) of a first coordinate system (which may have the origin O1) used by the VR host, wherein this coordinate is represented by "(−1, −2) @O1" in FIG. 1. However, the to-be-tracked human body 10 actually locates at a coordinate (0, −1) of the first coordinate system (i.e., "(0, −1) @O1"). That is, there exists an offset between the avatar 12 and the to-be-tracked human body 10. From another perspective, the offset between the avatar 12 and the to-be-tracked human body 10 can also be understood as the offset between the origins of the first coordinate system and the second coordinate system.

In FIG. 1, it is assumed that the virtual camera 14 is disposed at the origin O1 and has a field of view 199 facing the to-be-tracked human body 10. In this case, the avatar 12 corresponding to the to-be-tracked human body 10 should be displayed at the center of the visual content 15. However, due to the offset between the avatar 12 and the to-be-tracked human body 10, the avatar 12 would be displayed at the right side of the visual content 15, instead of being displayed at the center of the visual content 15, which may be problematic to the developers. In some cases, if the offset between the avatar 12 and the to-be-tracked human body 10 is too large, it might even make the avatar 12 displayed outside of the visual content 15, such that the user may not be able to see the avatar 12 in the visual content 15.

Therefore, it is necessary to develop a mechanism for better providing the visual content.

SUMMARY OF THE INVENTION

Accordingly, the disclosure is directed to a method for controlling an avatar in a virtual environment, a host, and a computer readable storage medium, which may be used to solve the above technical problems.

The embodiments of the disclosure provide a method for controlling an avatar in a virtual environment, including: receiving, by a host, a first pose of each of at least one target object from an external tracking device, wherein the at least one target object comprises a first target object; providing, by the host, a visual content associated with the virtual environment, wherein the visual content corresponds to a field of view of a virtual camera in the virtual environment; determining, by the host, a reference pose of a reference object in the virtual environment according to a camera pose of the virtual camera; determining, by the host, a pose difference between the first pose of the first target object and the reference pose of the reference object; determining, by the host, a second pose of each of the at least one target object via applying the pose difference to the first pose of each of the at least one target object; and displaying, by the host, the avatar corresponding to the at least one target object in the visual content based on the second pose of each of the at least one target object.

The embodiments of the disclosure provide a host including a storge circuit and a processor. The storage circuit stores a program code. The processor is coupled to the storage circuit and accesses the program code to perform: receiving a first pose of each of at least one target object from an external tracking device, wherein the at least one target object comprises a first target object; providing a visual content associated with a virtual environment, wherein the visual content corresponds to a field of view of a virtual camera in the virtual environment; determining a reference pose of a reference object in the virtual environment according to a camera pose of the virtual camera; determining a pose difference between the first pose of the first target object and the reference pose of the reference object; determining a second pose of each of the at least one target object via applying the pose difference to the first pose of each of the at least one target object; and displaying an avatar corresponding to the at least one target object in the visual content based on the second pose of each of the at least one target object.

The embodiments of the disclosure provide a computer readable storage medium, the computer readable storage medium recording an executable computer program, the executable computer program being loaded by a host to perform steps of: receiving a first pose of each of at least one target object from an external tracking device, wherein the at least one target object comprises a first target object; providing a visual content associated with a virtual environment, wherein the visual content corresponds to a field of view of a virtual camera in the virtual environment; determining a reference pose of a reference object in the virtual environment according to a camera pose of the virtual camera; determining a pose difference between the first pose of the first target object and the reference pose of the reference object; determining a second pose of each of the at least one target object via applying the pose difference to the first pose of each of the at least one target object; and displaying an avatar corresponding to the at least one target object in the visual content based on the second pose of each of the at least one target object.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
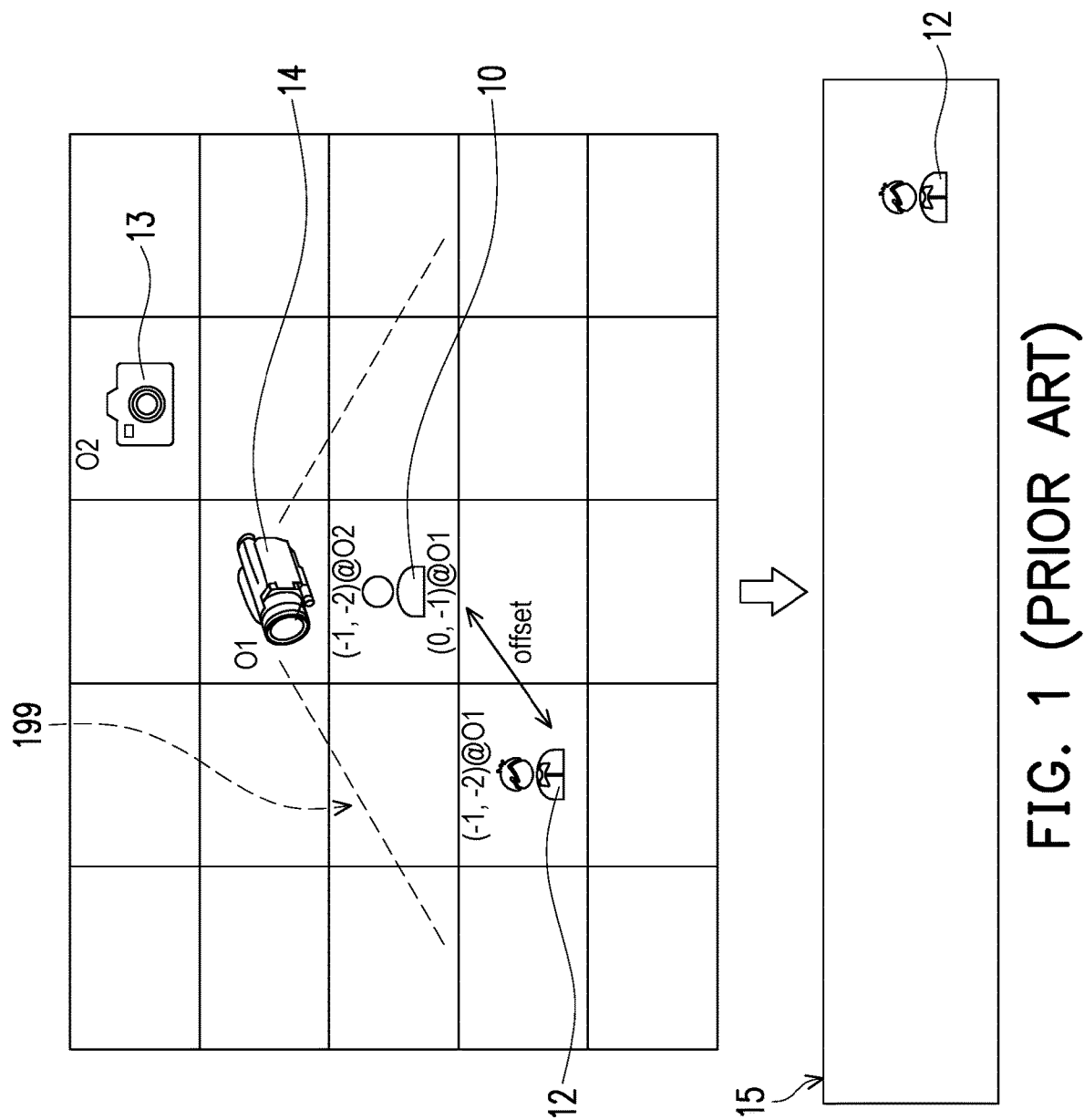
FIG. 1 shows a schematic diagram of a tracking scenario.

Reference will now be made in detail to the present preferred embodiments of the invention, examples of which are illustrated in the accompanying drawings. Wherever possible, the same reference numbers are used in the drawings and the description to refer to the same or like parts.

Figure 2:
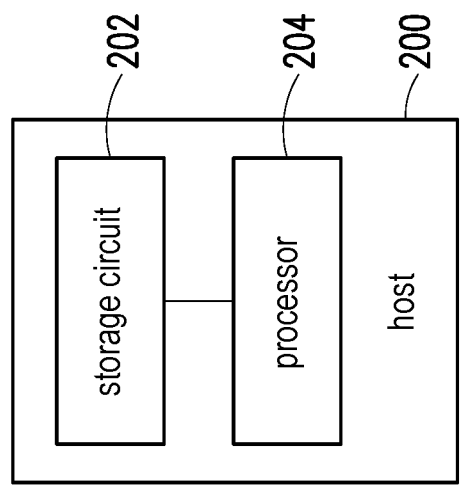
FIG. 2 shows a schematic diagram of a host according to an embodiment of the disclosure.

See FIG. 2, which shows a schematic diagram of a host according to an embodiment of the disclosure. In various embodiments, the host 200 can be any smart device and/or computer device that can provide visual contents of reality services such as virtual reality (VR) service, augmented reality (AR) services, mixed reality (MR) services, and/or extended reality (XR) services, but the disclosure is not limited thereto. In some embodiments, the host 200 can be a head-mounted display (HMD) capable of showing/providing visual contents (e.g., AR/VR contents) for the wearer/user to see. For better understanding the concept of the disclosure, the host 200 would be assumed to be the HMD for providing VR contents (e.g., the VR world) to the user, but the disclosure is not limited thereto.

In FIG. 2, the host 200 includes a storage circuit 202 and a processor 204. The storage circuit 202 is one or a combination of a stationary or mobile random access memory (RAM), read-only memory (ROM), flash memory, hard disk, or any other similar device, and which records a plurality of modules and/or a program code that can be executed by the processor 204.

The processor 204 may be coupled with the storage circuit 202, and the processor 204 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 204 may access the modules and/or the program code stored in the storage circuit 202 to implement the method for controlling an avatar in a virtual environment provided in the disclosure, which would be further discussed in the following.

Figure 3:
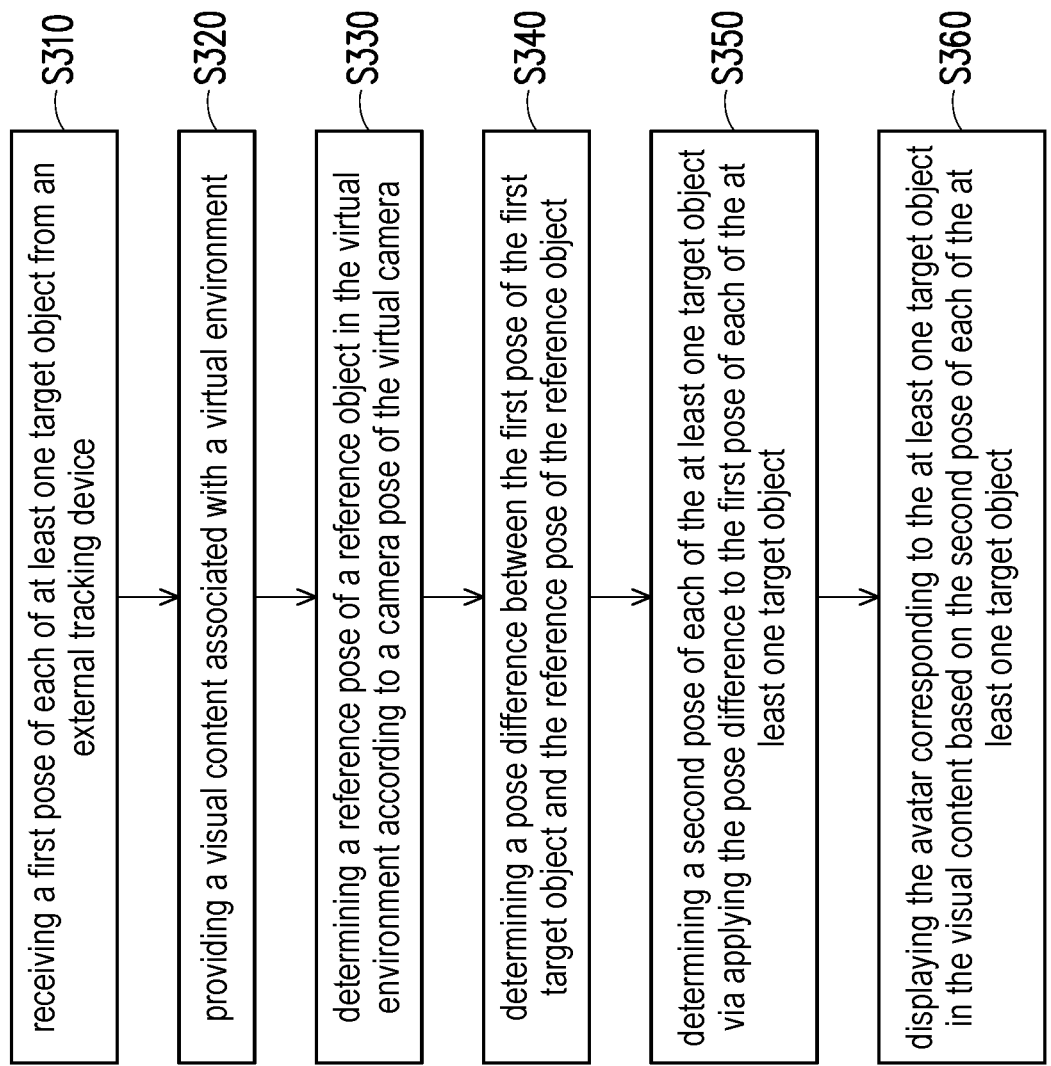
FIG. 3 shows a flow chart of the method for controlling an avatar in a virtual environment according to an embodiment of the disclosure.
Figure 4:
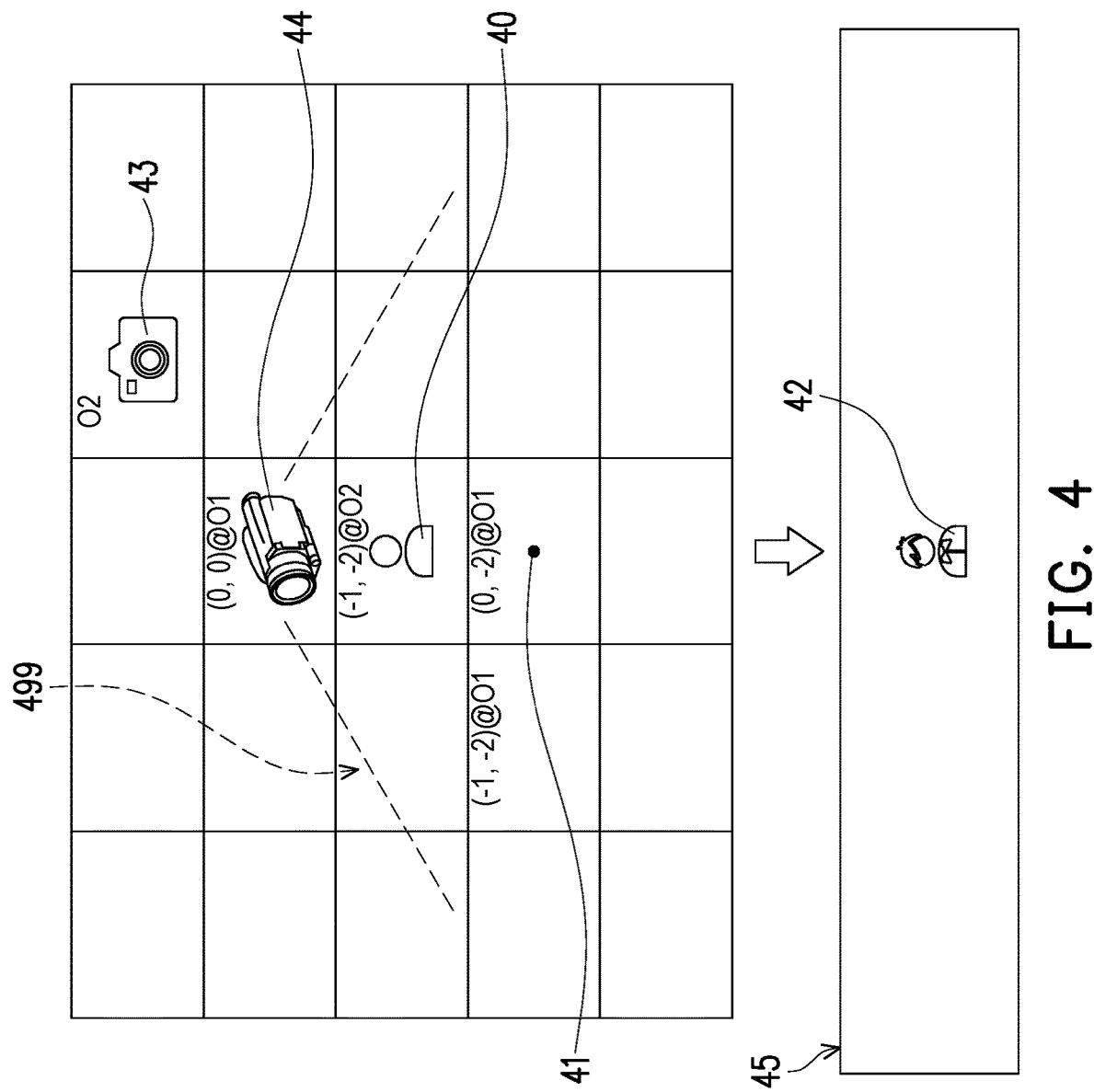
FIG. 4 shows an application scenario according to an embodiment of the disclosure.

See FIG. 3, which shows a flow chart of the method for controlling an avatar in a virtual environment according to an embodiment of the disclosure. The method of this embodiment may be executed by the host 200 in FIG. 2, and the details of each step in FIG. 3 will be described below with the components shown in FIG. 2. In addition, for better understanding the concept of the disclosure, FIG. 4 would be used as an example, wherein FIG. 4 shows an application scenario according to an embodiment of the disclosure.

In step S310, the processor 204 receives a first pose of each of at least one target object from an external tracking device 43.

In the embodiments of the disclosure, the external tracking device 43 can be used to capture images of at least one target object and accordingly determine, for example, the first pose of each of the target object.

In the embodiments of the disclosure, each of the mentioned pose can be characterized as a corresponding 6 degree-of-freedom (6DOF). However, for better understanding, each pose would be discussed with a two-dimensional coordinate, but the disclosure is not limited thereto.

In one embodiment, the target object may include least one first joint on a target body tracked by the external tracking device 43.

In FIG. 4, the human body 40 can be the considered target body. In this case, the external tracking device 43 may be used to capture images of the human body 40 and determine the first pose of each first joint on the human body 40. In some embodiments, the external tracking device 43 may use some existing pose detection algorithms to determine/track the first pose of each first joint on the human body 40.

In one embodiment, the external tracking device 43 may be used to track the first poses of several particular first joints on the human body 40, such as head, hands, shoulders, wrists, hips, knees, ankles, etc., but the disclosure is not limited thereto.

After determining/tracking the first poses of the considered first joints (e.g., the particular first joints in the above) on the human body 40, the external tracking device 43 may transmit the determined first poses of the considered first joints to the host 200.

In one embodiment, the target object may include a first target object. In some embodiments, the first target object can be one of the first joints. For better understanding, the first target object can be assumed to be the hip joint since the hip joint can be used to determine the position where the human body 40 locates, but the disclosure is not limited thereto.

In FIG. 4, the external tracking device 43 may determine that the first pose of the first target object to be coordinate (−1, −2) in the second coordinate system (which has the origin O2) used by the external tracking device 43. In this case, the processor 204 may determine that the first pose of the first target object to be coordinate (−1, −2) in the first coordinate system (which has the origin O1) used by the host 200.

In step S320, the processor 204 provides a visual content 45 associated with a virtual environment, wherein the visual content 45 corresponds to a field of view 499 of a virtual camera 44 in the virtual environment.

In FIG. 4, the scene captured/seen by the virtual camera 44 in the virtual environment (e.g., the VR environment/world) would be shown as the visual content 45 for the user of the host 200 to see.

In the embodiment where the host 200 is the HMD, the user wearing the HMD can see the visual content 45 displayed by the host 200. In another embodiment where the host 200 is a computer, the user of the host 200 may see the visual content on the screen controlled by the host 200, but the disclosure is not limited thereto.

In step S330, the processor 204 determines a reference pose of a reference object 41 in the virtual environment according to a camera pose of the virtual camera 44.

In the embodiments of the disclosure, the reference object 41 may be a point corresponding to a desired position of showing the avatar 42 corresponding to the target body (e.g., the human body 40). In FIG. 4, the reference object 41 may locate at a specific position (e.g., the center) within the field of view 499 of the virtual camera 44, but the disclosure is not limited thereto.

In one embodiment, the relative position between the camera pose and the reference pose can be fixed. Therefore, once the camera pose of the virtual camera 44 is determined by the processor 204 and/or the designer, the processor 204 may accordingly determine the reference pose of the reference object 41.

In one embodiment, it is assumed that the reference pose is (x, y−2) in the case where the camera pose is (x, y). Accordingly, the reference pose in FIG. 4 can be determined to be (0, −2) since the camera pose is assumed to be (0, 0), but the disclosure is not limited thereto.

In step S340, the processor 204 determines a pose difference between the first pose of the first target object and the reference pose of the reference object 41.

In FIG. 4, since the first pose of the first target object is assumed to be (−1, −2) and the reference pose of the reference object 41 is assumed to be (0, −2), the processor 204 may determine the pose difference therebetween to be (−1, 0) via subtracting the reference pose from the first pose of the first target object, but the disclosure is not limited thereto.

In step S350, the processor 204 determines a second pose of each of the at least one target object via applying the pose difference to the first pose of each of the at least one target object.

In one embodiment, when applying the pose difference to the first pose of each of the target object(s), the processor 204 may subtract the pose difference from the first pose of each of the target object(s).

For example, if one of the target object is a right wrist on the human body 40 and the external tracking device 43 determines that the first pose of the right wrist is (−2, −3) in the second coordinate system (e.g., the first pose of the right wrist can be represented by "(−2, −3) @O2"), the processor 204 may determine the corresponding second pose via subtracting the pose difference (e.g., (−1, 0)) from (−2, −3). In this case, the second pose of the right wrist may be determined to be (−1, −3) in the first coordinate system used by the host 200.

For another example, if one of the target object is a left shoulder on the human body 40 and the external tracking device 43 determines that the first pose of the left shoulder is (0, −2) in the second coordinate system (e.g., the first pose of the left shoulder can be represented by "(0, −2) @O2"), the processor 204 may determine the corresponding second pose via subtracting the pose difference (e.g., (−1, 0)) from (0, −2). In this case, the second pose of the left shoulder may be determined to be (+1, −2) in the first coordinate system used by the host 200.

In the embodiments of the disclosure, the second pose of other target object can be determined based on the above mechanism.

In step S360, the processor 204 displays the avatar 42 corresponding to the target object(s) in the visual content 45 based on the second pose of each of the target object(s).

In the embodiments of the disclosure, the avatar 42 has at least one second joint one-to-one corresponding to the at least one first joint, and each of the at least one second joint is displayed with the corresponding second pose. By following the above examples, the processor 204 may determine the corresponding second pose of the right wrist on the avatar 42 to be (−1, −3) and accordingly display the right wrist on the avatar 42 in the visual content 45. Likewise, the processor 204 may determine the corresponding second pose of the left shoulder on the avatar 42 to be (+1, −2) and accordingly display the left shoulder on the avatar 42 in the visual content 45. For other second joint on the avatar 42, the processor 204 may display them in the visual content 45 based on the corresponding second pose, but the disclosure is not limited thereto.

In FIG. 4, since the reference object 41 is assumed to locate at the center of the field of view 499 of the virtual camera 44, the avatar 42 (whose second joints are displayed with the corresponding second poses) would be displayed at the center of the visual content 45. That is, how the avatar 42 is shown in the visual content 45 would not be affected by the offset between the origins of the first coordinate system and the second coordinate system, such that the developing difficulties can be reduced.

In some embodiments, the processor 204 can perform step S330 only at the very beginning of the application of the visual content (e.g., game application) and only for avatar initial position configuration. That is, when the application of the visual content (e.g., game application) starts, the processor 204 can determine the reference pose of the reference object 41 and maintain the reference pose through the entire procedure of the user experiencing the visual content. In the case where the reference object 41 is assumed to be located at the center of the field of view 499, the avatar 42 will be accordingly displayed at the center of the visual content 45 at the very beginning of the application of the visual content, but the disclosure is not limited thereto.

In one embodiment, since the human body 40 may move (e.g., changing position/gesture/posture), how the avatar 42 is displayed in the visual content 45 can be accordingly adjusted.

In the embodiment where the reference pose is maintained through the entire procedure of the user experiencing the visual content, the avatar 42 may be displayed at the center of the visual content 45 (only) at the very beginning of the application. Afterwards, the avatar 42 may move in the visual content 45 in response to the movement of the human body 40.

In a first embodiment, the processor 204 may constantly maintain the avatar 42 to be shown at, for example, the center of the visual content 45. In a second embodiment, the processor 204 may recalibrate the avatar 42 back to, for example, the center of the visual content 45 whenever the avatar 42 is close to the boundary of the field of view of the virtual camera 44 (which can be also understood as being close to the boundary of the visual content 45). Details of the first and second embodiments would be discussed in the following.

Figure 5:
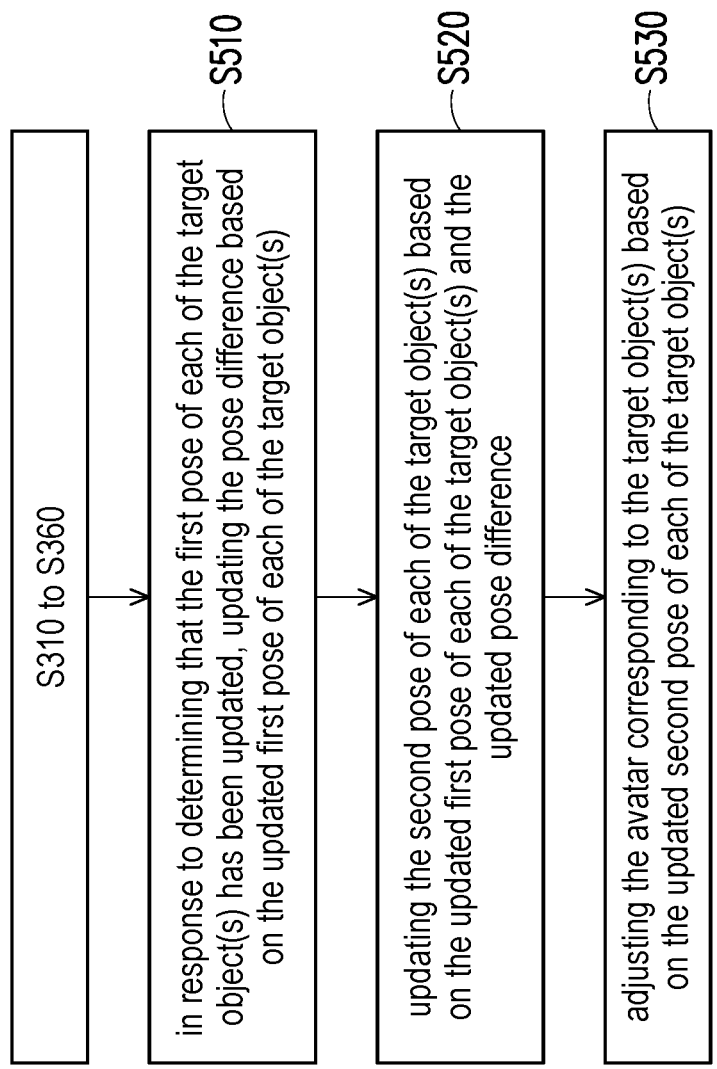
FIG. 5 shows a flow chart of the method for controlling an avatar in a virtual environment according to the first embodiment of the disclosure.

See FIG. 5, which shows a flow chart of the method for controlling an avatar in a virtual environment according to the first embodiment of the disclosure.

In FIG. 5, after performing steps S310 to S360, the processor 204 may further determine whether that the first pose of each of the target object(s) has been updated.

Since the first pose of each of the target object(s) is tracked by the external tracking device 43, the updated first pose of the target object(s) indicates that the human body 40 has moved.

In this case, in step S510, in response to determining that the first pose of each of the target object(s) has been updated, the processor 204 updates the pose difference based on the updated first pose of each of the target object(s).

In one embodiment, the processor 204 determines another pose difference between the updated first pose of the first target object and the reference pose of the reference object 41 as the updated pose difference.

For example, if the updated first pose of the first target object (e.g., the hip joint of the human body 40) is the coordinate (0, −3) @O2, the processor 204 determine the another pose difference to be (0, −1) via subtracting the reference pose (e.g., (0, −2)) from the updated first pose of the first target object (e.g., (0, −3)), but the disclosure is not limited thereto.

In step S520, the processor 204 updates the second pose of each of the target object(s) based on the updated first pose of each of the target object(s) and the updated pose difference.

In one embodiment, the processor 204 may determine the updated second pose of each of the target object(s) via applying the updated pose difference to the updated first pose of each of the target object(s), and the associated details may be referred to the descriptions of step S350, which would not be repeated herein.

In step S530, the processor 204 adjusts the avatar 42 corresponding to the target object(s) based on the updated second pose of each of the target object(s). In one embodiment, the processor 204 can adjust the avatar 42 via adjusting the pose/position of the avatar 42 based on the updated second pose of each of the target object(s).

For example, the processor 204 can display the avatar 42 corresponding to the target object(s) in the visual content 45 based on the updated second pose of each of the target object(s), and the associated details can be referred to the descriptions of step S360, which would not be repeated herein.

In this case, even the human body 40 has moved, the corresponding avatar 42 can stilled be shown/maintained at, for example, the center of the visual content 45.

Figure 6:
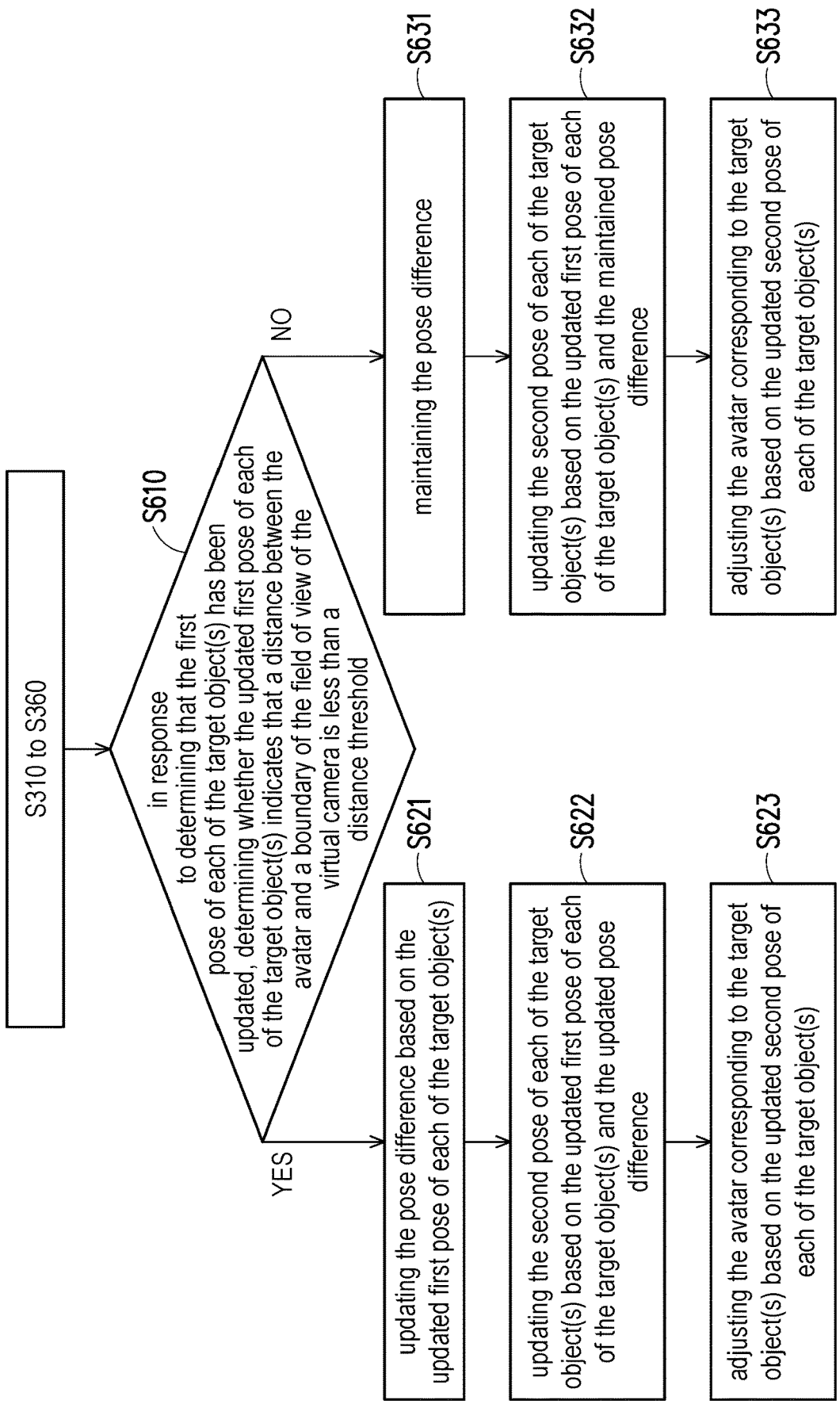
FIG. 6 shows a flow chart of the method for controlling an avatar in a virtual environment according to the second embodiment of the disclosure.

See FIG. 6, which shows a flow chart of the method for controlling an avatar in a virtual environment according to the second embodiment of the disclosure.

In FIG. 6, after performing steps S310 to S360, the processor 204 may further determine whether that the first pose of each of the target object(s) has been updated as mentioned in the above.

In step S610, in response to determining that the first pose of each of the target object(s) has been updated, the processor 204 determines whether the updated first pose of each of the target object(s) indicates that a distance between the avatar 42 and a boundary of the field of view 499 of the virtual camera 44 is less than a distance threshold. From another perspective, the processor 204 may determine whether the updated first pose of each of the target object(s) indicates that a distance between the avatar 42 and a boundary of the visual content 45 is less than a distance threshold. In some embodiments, the distance threshold can be determined to be a distance showing that the avatar 42 is going to be outside of the visual content 45, but the disclosure is not limited thereto.

In one embodiment, if the distance between the avatar 42 and the boundary of the field of view 499 of the virtual camera 44 is less than the distance threshold (or the distance between the avatar 42 and the boundary of the visual content 45 is less than the distance threshold), it means that the avatar 42 is going to be outside of the visual content 45. In this case, the processor 204 may perform step S621 to updating the pose difference based on the updated first pose of each of the target object(s). The process of determining the updated pose difference can be referred to the descriptions of S510, which would not be repeated herein.

In step S622, the processor 204, the processor 204 updates the second pose of each of the target object(s) based on the updated first pose of each of the target object(s) and the updated pose difference. In step S623, the processor 204 adjusts the avatar 42 corresponding to the target object(s) based on the updated second pose of each of the target object(s). Details of steps S622 and S623 can be referred to the descriptions of S520 and S530, which would not be repeated herein.

That is, when the processor 204 determines that the avatar 42 (which moves in response to the human body 40) is going to be outside of the visual content 45, the processor 204 may perform steps S621 to S623 to bring the avatar 42 back to, for example, the center of the visual content 45.

On the other hand, if the distance between the avatar 42 and the boundary of the field of view 499 of the virtual camera 44 is not less than the distance threshold (or the distance between the avatar 42 and the boundary of the visual content 45 is not less than the distance threshold), it means that the avatar 42 is less likely to become outside of the visual content 45. In this case, the processor 204 may perform step S631 to maintain the pose difference. That is, the pose difference would not be updated as in step S621.

Next, in step S632, the processor 204 updates the second pose of each of the target object(s) based on the updated first pose of each of the target object(s) and the maintained pose difference. In step S633, the processor 204 adjusts the avatar 42 corresponding to the target object(s) based on the updated second pose of each of the target object(s). In one embodiment, the processor 204 can adjust the avatar 42 via adjusting the pose/position of the avatar 42 based on the updated second pose of each of the target object(s).

In this case, the avatar 42 would be observed to be moving in the visual content 45 along with the movement of the human body 40, instead of being maintained, for example, at the center of the visual content 45.

That is, when the processor 204 determines that the avatar 42 (which moves in response to the human body 40) is less likely to become outside of the visual content 45, the processor 204 may perform steps S631 to S633 to let the avatar 42 move within the visual content 45.

The disclosure further provides a computer readable storage medium for executing the method for controlling an avatar in a virtual environment. The computer readable storage medium is composed of a plurality of program instructions (for example, a setting program instruction and a deployment program instruction) embodied therein. These program instructions can be loaded into the host 200 and executed by the same to execute the method for controlling an avatar in a virtual environment and the functions of the host 200 described above.

In summary, in the embodiments of the disclosure, the avatar corresponding to the target object tracked by the external tracking device can be properly displayed in the visual content that corresponds to the field of view of the virtual camera, even if the coordinate systems used by the host and the external tracking device are different. Accordingly, the developing difficulties can be reduced.

In addition, since the gesture/posture/place of the avatar shown in the visual content matches the gesture/posture/place of the tracked human body, the user can feel more immersive during watching the visual content. Moreover, since the solution provided by the disclosure can be understood as automatically correcting the projection place of the avatar in the visual content, the user does not have to worry about where to place the external tracking device.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for controlling an avatar in a virtual environment, comprising:
   receiving, by a host, a first pose of each of at least one target object from an external tracking device, wherein the at least one target object comprises a first target object;
   providing, by the host, a visual content associated with the virtual environment, wherein the visual content corresponds to a field of view of a virtual camera in the virtual environment;
   determining, by the host, a reference pose of a reference object in the virtual environment according to a camera pose of the virtual camera;
   determining, by the host, a pose difference between the first pose of the first target object and the reference pose of the reference object;
   determining, by the host, a second pose of each of the at least one target object via applying the pose difference to the first pose of each of the at least one target object; and
   displaying, by the host, the avatar corresponding to the at least one target object in the visual content based on the second pose of each of the at least one target object.

2. The method according to claim 1, wherein a relative position between the camera pose and the reference pose is fixed.

3. The method according to claim 1, wherein the reference object locates at a specific position within the field of view of the virtual camera.

4. The method according to claim 1, wherein after the step of displaying the avatar corresponding to the at least one target object in the visual content based on the second pose of each of the at least one target object, the method further comprises:
   in response to determining that the first pose of each of the at least one target object has been updated, updating the pose difference based on the updated first pose of each of the at least one target object;
   updating the second pose of each of the at least one target object based on the updated first pose of each of the at least one target object and the updated pose difference; and
   adjusting the avatar corresponding to the at least one target object based on the updated second pose of each of the at least one target object.

5. The method according to claim 4, wherein the step of updating the pose difference based on the updated first pose of each of the at least one target object comprises:
   determining another pose difference between the updated first pose of the first target object and the reference pose of the reference object as the updated pose difference.

6. The method according to claim 1, wherein after the step of displaying the avatar corresponding to the at least one target object in the visual content based on the second pose of each of the at least one target object, the method further comprises:
   in response to determining that the first pose of each of the at least one target object has been updated, determining whether the updated first pose of each of the at least one target object indicates that a distance between the avatar and a boundary of the field of view of the virtual camera is less than a distance threshold;
   in response to determining that the distance between the avatar and the boundary of the field of view of the virtual camera is less than the distance threshold, updating the pose difference based on the updated first pose of each of the at least one target object;
   updating the second pose of each of the at least one target object based on the updated first pose of each of the at least one target object and the updated pose difference; and
   adjusting the avatar corresponding to the at least one target object based on the updated second pose of each of the at least one target object.

7. The method according to claim 6, wherein in response to determining that the distance between the avatar and the boundary of the field of view of the virtual camera is not less than the distance threshold, the method further comprises:
   maintaining the pose difference;
   updating the second pose of each of the at least one target object based on the updated first pose of each of the at least one target object and the maintained pose difference; and
   adjusting the avatar corresponding to the at least one target object based on the updated second pose of each of the at least one target object.

8. A host, comprising:
   a non-transitory storage circuit, storing a program code; and
   a processor, coupled to the non-transitory storage circuit and accessing the program code to perform:
      receiving a first pose of each of at least one target object from an external tracking device, wherein the at least one target object comprises a first target object;
      providing a visual content associated with a virtual environment, wherein the visual content corresponds to a field of view of a virtual camera in the virtual environment;
      determining a reference pose of a reference object in the virtual environment according to a camera pose of the virtual camera;
      determining a pose difference between the first pose of the first target object and the reference pose of the reference object;

determining a second pose of each of the at least one target object via applying the pose difference to the first pose of each of the at least one target object; and displaying an avatar corresponding to the at least one target object in the visual content based on the second pose of each of the at least one target object.

9. The host according to claim 8, wherein a relative position between the camera pose and the reference pose is fixed.

10. The host according to claim 8, wherein the reference object locates at a specific position within the field of view of the virtual camera.

11. The host according to claim 8, wherein after displaying the avatar corresponding to the at least one target object in the visual content based on the second pose of each of the at least one target object, the processor further performs:

in response to determining that the first pose of each of the at least one target object has been updated, updating the pose difference based on the updated first pose of each of the at least one target object;

updating the second pose of each of the at least one target object based on the updated first pose of each of the at least one target object and the updated pose difference; and adjusting the avatar corresponding to the at least one target object based on the updated second pose of each of the at least one target object.

12. The host according to claim 8, wherein after displaying the avatar corresponding to the at least one target object in the visual content based on the second pose of each of the at least one target object, the processor further performs:

in response to determining that the first pose of each of the at least one target object has been updated, determining whether the updated first pose of each of the at least one target object indicates that a distance between the avatar and a boundary of the field of view of the virtual camera is less than a distance threshold;

in response to determining that the distance between the avatar and the boundary of the field of view of the virtual camera is less than the distance threshold, updating the pose difference based on the updated first pose of each of the at least one target object;

updating the second pose of each of the at least one target object based on the updated first pose of each of the at least one target object and the updated pose difference; and adjusting the avatar corresponding to the at least one target object based on the updated second pose of each of the at least one target object.

13. The host according to claim 12, wherein in response to determining that the distance between the avatar and the boundary of the field of view of the virtual camera is not less than the distance threshold, the processor further performs:

maintaining the pose difference;

updating the second pose of each of the at least one target object based on the updated first pose of each of the at least one target object and the maintained pose difference; and adjusting the avatar corresponding to the at least one target object based on the updated second pose of each of the at least one target object.

14. A non-transitory computer readable storage medium, the computer readable storage medium recording an executable computer program, the executable computer program being loaded by a host to perform steps of:

receiving a first pose of each of at least one target object from an external tracking device, wherein the at least one target object comprises a first target object;

providing a visual content associated with a virtual environment, wherein the visual content corresponds to a field of view of a virtual camera in the virtual environment;

determining a reference pose of a reference object in the virtual environment according to a camera pose of the virtual camera;

determining a pose difference between the first pose of the first target object and the reference pose of the reference object;

determining a second pose of each of the at least one target object via applying the pose difference to the first pose of each of the at least one target object; and displaying an avatar corresponding to the at least one target object in the visual content based on the second pose of each of the at least one target object.

* * * * *